United States Patent [19]

Coes

[11] Patent Number: 5,138,791
[45] Date of Patent: Aug. 18, 1992

[54] FISHHOOK EXTRACTOR

[76] Inventor: Rufus Coes, Small Point Rd., HCR 32 - Box 414, Sebasco, Me. 04565

[21] Appl. No.: 600,013

[22] Filed: Oct. 18, 1990

[51] Int. Cl.$^5$ .............................................. A01K 97/00
[52] U.S. Cl. .......................................... 43/53.5; 43/4
[58] Field of Search .................................. 43/53.5, 4

[56] References Cited

U.S. PATENT DOCUMENTS

| | | | |
|---|---|---|---|
| 1,629,583 | 5/1927 | Nelson | 43/53.5 |
| 2,561,281 | 7/1951 | Lawrence | 43/53.5 |
| 2,695,471 | 11/1954 | Imberti | 43/53.5 |
| 2,998,670 | 9/1961 | Edwards | 43/53.5 |
| 3,803,742 | 4/1974 | Foster | 43/4 |
| 4,014,131 | 3/1977 | Bendik | 43/53.5 |
| 5,084,999 | 2/1992 | Henry | 43/53.5 |

Primary Examiner—Richard K. Seidel
Assistant Examiner—Patty E. Hong
Attorney, Agent, or Firm—Wolf, Greenfield & Sacks

[57] ABSTRACT

A fishhook extractor having an handle at one end and a shaft or blade with a fishhook engagement means at the other end is described. The blade curves downwardly and has a V-shaped cross-section. The apex of the V has a central groove and the V and central groove terminate in a smoothly integrated central notch at the blade end. The user positions the central V groove of the fishhook extractor against the tightened line and slides the tool towards the throat of the hook. Forward pressure with the extractor against the throat of the hook causes the barb of the hook to point in a direction which is close to the original angle of hook entry. The user then pushes the engaged tool to extract the embedded hook.

10 Claims, 2 Drawing Sheets

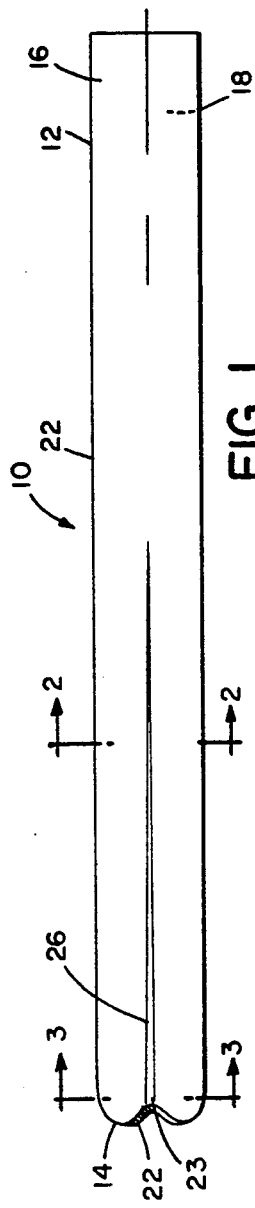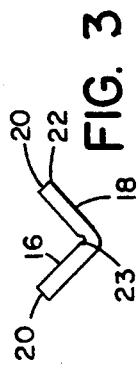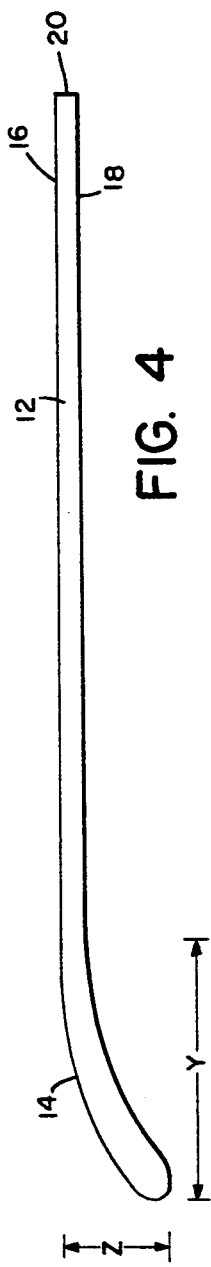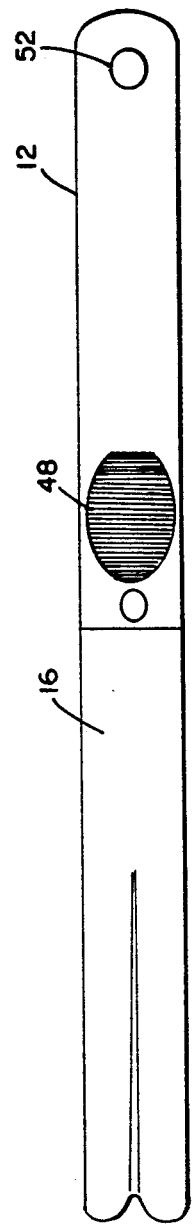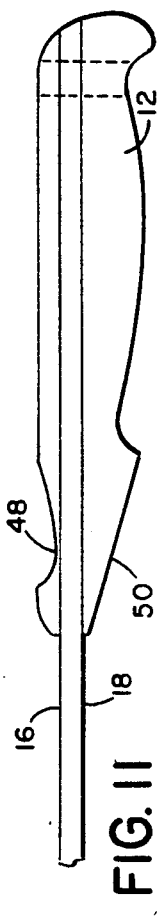

FISHHOOK EXTRACTOR

FIELD OF THE INVENTION

The present invention relates to a fishhook extractor for locating and extracting a fishhook that has been embedded in a fish.

BACKGROUND OF THE INVENTION

After a fish has been caught on a hook and line it is usually necessary to remove the embedded hook from the tissue of the fish. Most fishhooks however, are embedded inside the fish and are designed to resist removal. In addition, most freshly caught fish are slippery and active and some have sharp teeth, fins or gill plates. Under these circumstances, fishhook removal is often difficult and dangerous. The convenience and safety of the user and the safety of the fish itself, often depend on the proper use of an effective hook extractor.

Numerous tools have been suggested for the removal of hooks from fish. These fishhook extractors share one or more of several disadvantages. In order to engage the embedded hook and effect its removal, these extractors require special skills and/or excessive force. In use, they subject the user to unnecessary risk of injury from the fish and they often subject the fish to unnecessary risk of injury from excessive handling and force. Many of these fishhook extractors have limited versatility with respect to the various types and sizes of hooks for which they can be used effectively, as well as limited versatility with respect to the fish species and fish sizes on which they can be used. They are often formed with features and edges which can tangle, cut or otherwise damage fishing tackle, fish or user They are often complex in form and therefore are expensive to manufacture.

SUMMARY OF THE INVENTION

According to the present invention there is provided a fishhook extractor having a generally elongated body comprising a flat handle end and a curved blade end. A notch is placed at the terminus of the blade end. The body of the extractor presents a generally concave shape in side elevation, and in cross section has a V-shaped guide element that gradually increases in depth towards the notched end. The V-shaped guide and terminal notch engage the hook. In a preferred embodiment, the elongated body has a central groove which cooperates with the apex of the V-shaped guide element.

DESCRIPTION OF THE DRAWINGS

FIG. 1 is a top plan view of the fishhook extractor;

FIG. 2 is a cross sectional end view of the extractor taken along line 2—2 in FIG. 1;

FIG. 3 is a cross sectional end view of the extractor taken along line 3—3 in FIG. 1;

FIG. 4 is a side view of the extractor of FIG. 1;

FIG. 10 is a top plan view of another embodiment of the handle of the extractor showing a thumb grip; and FIG. 11 is a side view of another embodiment of the extractor showing a thumb grip and hook sharpening means.

DETAILED DESCRIPTION OF THE INVENTION

Figure 5:
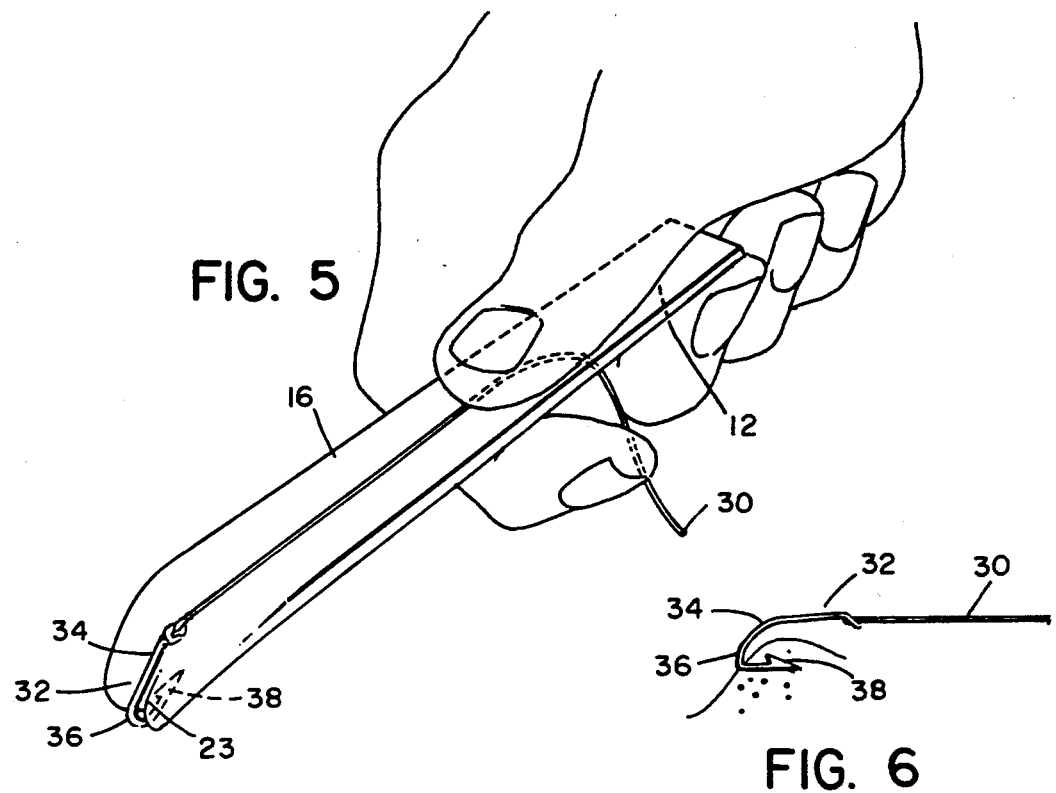
FIG. 5 is a perspective view of the extractor of FIG. 1 engaged with a hook.

Referring now to FIGS. 1-4 of the drawings, it will be seen that the fishhook extractor 10 is formed of an elongated unitary body and comprises a flat handle 12 and a generally rounded blade 14. The extractor can be formed of any number of relatively hard materials such as metal or plastic, provided that it is amenable to simple manufacture. The extractor is best formed by molding or stamping plastic or corrosion resistant metal blanks followed by final machine finishing.

Extractor 10, for the major portion of its length, is preferably straight, presenting generally parallel upper 16 and lower surfaces 18 respectively, and side surfaces 20. The edges 22 between adjacent surfaces are preferably rounded to eliminate sharp corners. A straight and substantially rectangular portion of extractor 10 is referred to as the handle 12.

Blade 14 is located at the opposite end of extractor 10 from the handle 12. Blade 14 is substantially rounded and has a smoothly integrated central notch 23.

At some distance Y away from the end adjacent to handle 12, the generally straight handle 12 begins to gradually curve downwardly in an arcuate configuration, as seen in side view (FIG. 4). Nevertheless, the distance between the upper 16 and lower 18 surfaces (i.e. the thickness) remains substantially the same.

Beginning at the point along handle 12 where the arcuate section begins, the substantially rectangular vertical cross section of the handle begins to take on a V-shaped aspect, as seen in FIGS. 2 and 3. The V-shape gradually increases in depth, as seen in cross-section, so that the greatest depth of the V occurs at the end of the blade having notch 23.

In a particularly preferred embodiment, the apex 24 of the V-shaped body cooperates with a central groove 26. Generally, the central groove 26 will terminate where the flat portion of the handle 12 begins. The width of the central groove 26 is generally tapered and decreases in size away from the end having notch 23. The arcuate blade with its V-shaped aspect, terminal notch and central groove are collectively referred to as the "V-shaped guide element."

The proportions of the blade and handle of the extractor can be varied with respect to its length, width, depth of V-shaped guide element, amount of curvature, thickness and the like, in order to deal most effectively with specific ranges of hook types and sizes, including multiple hook lures. Thus, this fishhook extractor can work effectively on specific ranges of fish species and sizes. For example, a fishhook extractor of the invention can be fabricated for use with salt water fish such as salmon, striped bass and bluefish. For example, referring again to FIG. 4, an extractor for these fish can be about 2.22 cm (⅞ inches) wide and 25.4 cm (10 inches) in length. The V-shaped guide element will have, in its arcuate configuration, a total drop Z of 2.8 cm (1 ⅛ inches). This drop will be over a total horizontal distance Y of about 8.5 cm (2 ⅜ inches). The thickness of the extractor is approximately 0.5 cm (3/16 th inches). In another embodiment, the extractor can be a smaller size useful for fresh water species such as bass, pickerel and trout. In this configuration, the extractor can be about 1.90 cm (¾ inch) wide by 17.7 cm (7 inches) long with a V-shaped guide element drop Z of about 1.7 cm (11/16 th inch) over a horizontal distance Y of approximately 3.17 cm (1 ¼ inches). The extractor in this embodiment is approximately 0.3 cm (⅛ th inch) thick. In yet another configuration, the extractor of the invention can be sized to be used with small trout and panfish. In this embodiment, the length of the extractor is about 12.5 cm (5 inches), having a width of about 1.3 cm (½ inch) and a thickness of about 0.3 cm (1/10 inch). The drop Z of the V-shaped guide element is approximately 1.2 cm (½ inch) over a horizontal distance Y of about 2 cm (8/10 inch).

Figure 6:
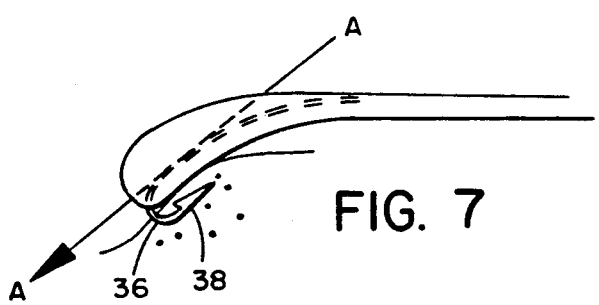
FIG. 6 is a side view of an embedded hook.
Figure 7:
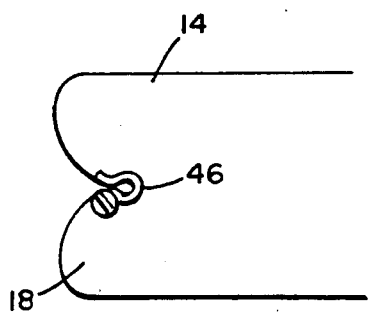
FIG. 7 is a side view of the embedded hook of FIG. 6 after being engaged and tilted to removal position by the extractor of FIG. 1.

The operation of the device of this invention will now be described with reference to FIGS. 5-7. It will be understood that the extractor is held by the operator with the upper surface 16 of the handle 12 disposed away from the fishhook, the notched end toward the hook, and the arcuate section curving downwardly. Referring in greater detail to FIGS. 5-7 there is shown a fishing line 30 to which is connected a fishhook 32 having a shank portion 34 and a throat portion 36 of a single barb 38. The hook 32 is embedded by means of the barb 38 in the fish.

When the fish is ready for removal of the embedded hook 32, the fisherman grips the handle 12 of the extractor in order to engage the notch 23 with the throat 36 of the embedded fishhook. First, the user positions the V-shaped guide element of the fishhook extractor against the tightened fishing line 30 leading to the embedded fishhook as shown in FIG. 5. The user then slides the extractor toward the hook. The V-shaped guide element helps the extractor move along the fishing line 30 past the shank 34 of the hook until the terminal notch 23 of the extractor seats itself in the throat 36 of the hook 32 as shown in FIG. 5. Because the tool helps guide and seat itself, minimal skill is required to position it properly even when the hook is deep inside the fish. The curve of the blade and its smooth rounded surfaces enable the extractor to slide past knots, weights, swivels, lure parts, bait and other tackle as well as anatomical features of the fish with the least possible difficulty or damage to tackle, fish, or user In addition, the length of the blade enables the user to position the extractor with little risk of injury from the fish. Under certain circumstances, the extractor can be used to actually pry the jaw of the fish open.

After the extractor is properly inserted with the notch 23 and V-shaped guide element cooperating with the throat 36 of the fishhook, the user then squeezes the fishing line against the handle 12 using the thumb (FIG. 5). Thumb pressure secures the line taut and enables the user to maintain positive control of the hook and line during and after removal.

An embedded hook normally resists extraction because of the barb 38 (FIG. 6). When the extractor of this invention is securely engaged with the throat 36 of the hook, the V-shaped guide element forces the shank 34 of the hook to tilt upwardly so that the throat 36 of the hook is forced downwardly and the barb 38 points in a direction (A—A) which is close to the original angle of hook entry (FIG. 7). This tilted position reduces the resistance of the hook to removal, and minimizes the ripping of the flesh of the fish by the barb.

The user then pushes the properly engaged extractor towards the throat 36 of the embedded hook as shown in FIGS. 5 and 7. Firm but relatively light pressure is usually sufficient to move the hook downward and away from the user so that the barb 38 is disengaged from the flesh.

After the hook is removed from the flesh of the fish, the shank 34 remains secure against the upper surface of the blade while the portion of the hook containing the barb 38 comes to rest close to the lower surface of the blade. With the barb of the hook secure, the extractor can be handled by the operator without danger of being pierced by the point of the hook. Also, because the extractor removes the hook with minimal tearing or ripping its flesh, the least possible injury is caused to the fish by removal of the hook.

Figure 8:
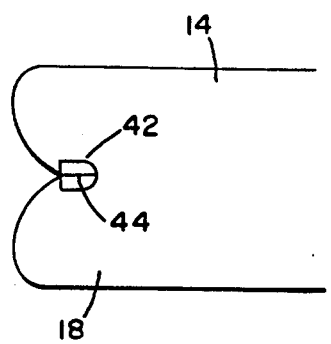
FIG. 8 is a bottom view of the extractor showing a hook retaining feature.
Figure 9:
FIG. 9 is a bottom view of an extractor showing another embodiment of a hook retaining feature.

Various modifications of the fishhook extractor can be developed without departing from the scope of the invention. Examples of such modifications will be described with reference to FIGS. 8-10. In one embodiment of this invention, means for securing the fishing hook to the extractor can be positioned on the device. This will enable the user to maintain greater positive control of the hook and prevent the hook from being detached from the extractor after the hook is removed. In one example, the attachment mechanism is a simple rubber or plastic insert 42 with a slit 44 in blade 14 (FIG. 8) through which the hook is held. Alternatively, as shown in FIG. 9, the attachment mechanism may be a small spring clip 46 on the blade 14 in which the hook is retained (FIG. 9). Other attachment mechanisms will be readily apparent to those skilled in the art. The attachment mechanism is preferably positioned on the lower surface of the device in such a manner that it does not engage the fishing line when the device is being positioned for use.

The handle can also be modified to provide for a better grip or increased comfort. For example, the handle 12 may be provided with a coating of cork or water impermeable material such as plastic or other polymer. Moreover, handle 12 can be molded to be engaged by the fingers of the hand, as illustrated in FIGS. 10 and 11 which shows a textured depression 48 on the upper surface 16 of the handle 12 designed to cooperate with the user's thumb.

In other embodiments, the extractor can be provided with accessory functions. These functions can include capability for a hook sharpening. For example, FIG. 11 illustrates a handle 12 with a file or whetstone 50 embedded on its lower surface 18. In another example, means for attaching the extractor to the user or to other pieces of equipment can be provided by a lanyard hole 52 in the handle 12 (FIG. 10). Other attachment means such as screw eyes would be readily apparent to one of ordinary skill in the art.

By holding blade 14, handle 12 can also be used to stun or kill a caught fish. Knives are not suitable for this purpose because the knife blade cannot be held.

Those skilled in the art will recognize, or be able to ascertain using no more than routine experimentation, many equivalents to the specific embodiments of the invention described herein. Such equivalents are intended to be encompassed by the following claims.

What is claimed is:
1. A fishhook extractor comprising a handle and blade spaced from said handle, said blade having a notch disposed at an end spaced from said handle, said blade as seen in side elevation having an arcuate shape curving downwardly toward said notch and having a shape of a V as viewed from said notch end, said notch residing in an apex of said V, said notch, said V and said arcuate shape of said blade being adapted to seat in a curved throat of a fishhook having a barbed distal end, so that the distal end of the fishhook is spaced from said blade.

2. The extractor of claim 1, wherein said blade comprises a groove residing in the apex of said V, adapted to receive a fishing line connected to the fishhook, said groove increasing in width towards said notch.

3. The extractor of claim 2, wherein said V shape increases in depth towards said notch end.

4. The extractor of claim 3, further comprising a means for retaining a hook.

5. The extractor of claim 4, wherein said handle comprises a textured area provided on an upper surface thereof.

6. The extractor of claim 4, wherein said means for retaining a hook comprises a resilient member disposed in said notch, said resilient member having a slit for releasably holding a fishhook therein.

7. The extractor of claim 4, wherein said means for retaining a hook comprises a spring clip disposed adjacent said notch, said spring clip being adapted for releasably holding a fishhook therein.

8. A fishhook extractor comprising a generally flat handle portion and a blade portion, said blade portion being formed in the shape of a V and having a notch disposed at an end thereof spaced from said handle, said notch residing in an apex of said V-shaped blade portion, said apex having a groove residing therein adapted to receive a fishing line, said extractor curving downwardly from said handle portion to said blade portion to form a curved surface to allow said blade to be thrust down a throat of a fish and to permit said blade to be guided along the fishing line and to be seated in a curved throat of a fishhook having a barbed distal end so that said notch engages the fishhook and positions it for removal thereof, said distal end of the fishhook being spaced from said blade.

9. A method of removing an embedded fishhook by a user, said fishhook having a shank and a curved throat, a barbed distal end and being attached to a fishing line, said method using a fishhook extractor having a handle with a blade spaced from said handle, said blade having a notch disposed at an end spaced from said handle, said blade as seen in side elevation having an arcuate shape curving downwardly towards said notch to form a curved surface, and having the shape of a V as viewed from said notch end, said notch residing in an apex of said V, said method comprising the steps of:
a. holding the extractor by the handle with the notched end towards the hook and the arcuate blade curving downwardly;
b. engaging the fishing line with the apex of the V-shaped blade;
c. sliding the extractor towards the hook along said fishing line whereby said arcuate blade is aligned with and seats in the curved throat of the fishhook, said notch is engaged therewith, and whereby the barbed end of the fishhook is spaced from the downwardly curving surface of the blade and the shank is tilted upwardly;
d. maintaining the fishing line taut against the apex of the V-shaped blade; and
e. pushing the aligned extractor towards the throat of the embedded fishhook to move the hook downwardly and then away from the user so that the fishhook is disengaged from the fish.

10. A fishhook extractor comprising,
a handle connected to a blade spaced from said handle, said handle and blade having an upper surface and a lower surface, said blade having a notch disposed at an end spaced from said handle, said blade as seen in side elevation having an arcuate shape curving downwardly toward said notch, the blade having a shape of a V as viewed from said notch end, said notch residing in an apex of said V, said notch, said V, and said downwardly curving upper surface of said blade adapted to be seated in a curved throat of a fishhook having a barbed distal end, whereby said downwardly curving upper surface and said curved throat are substantially aligned in parallel, said distal end of the fishhook being spaced from said lower surface of said blade.

* * * * *